Patented Sept. 15, 1936

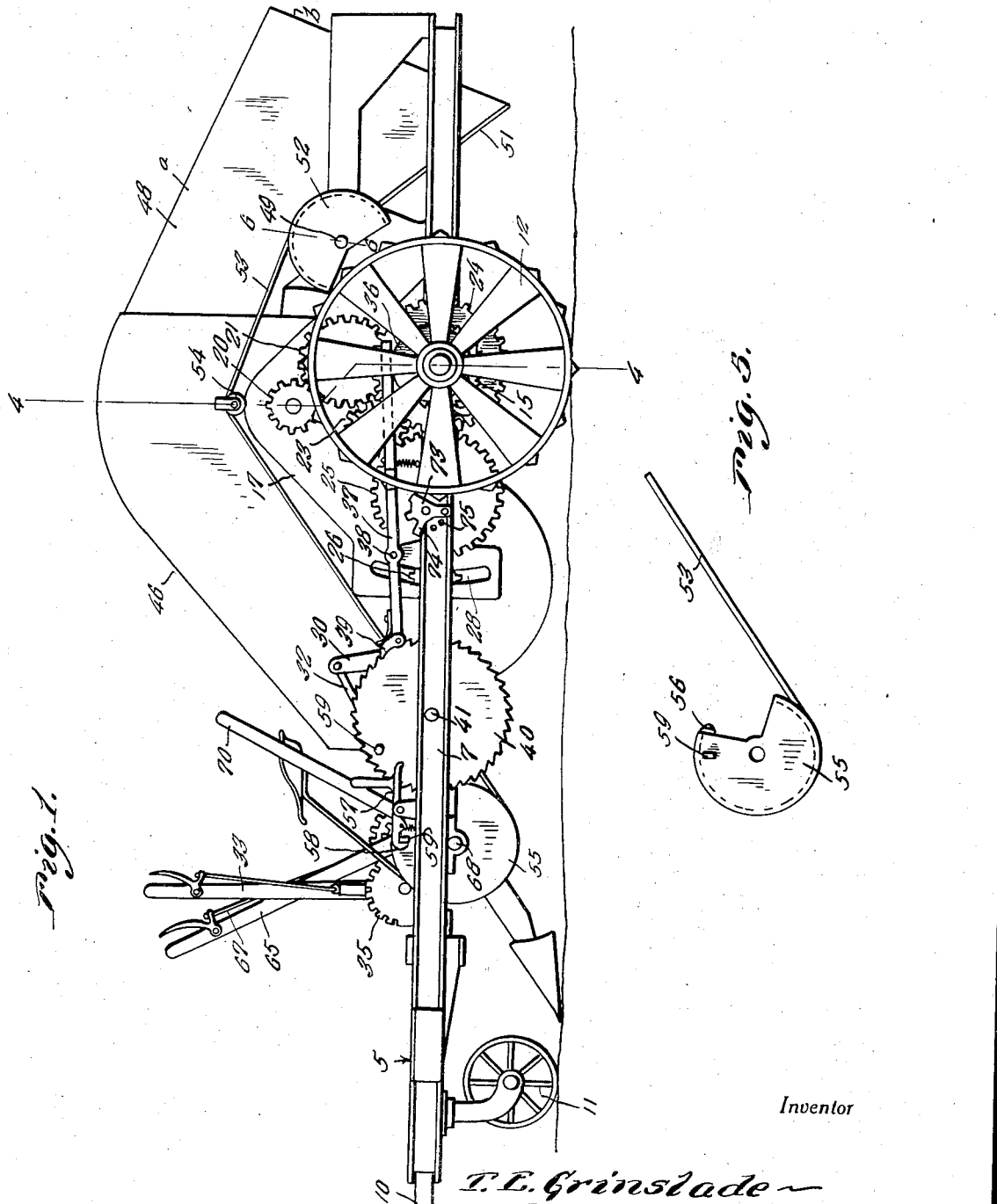

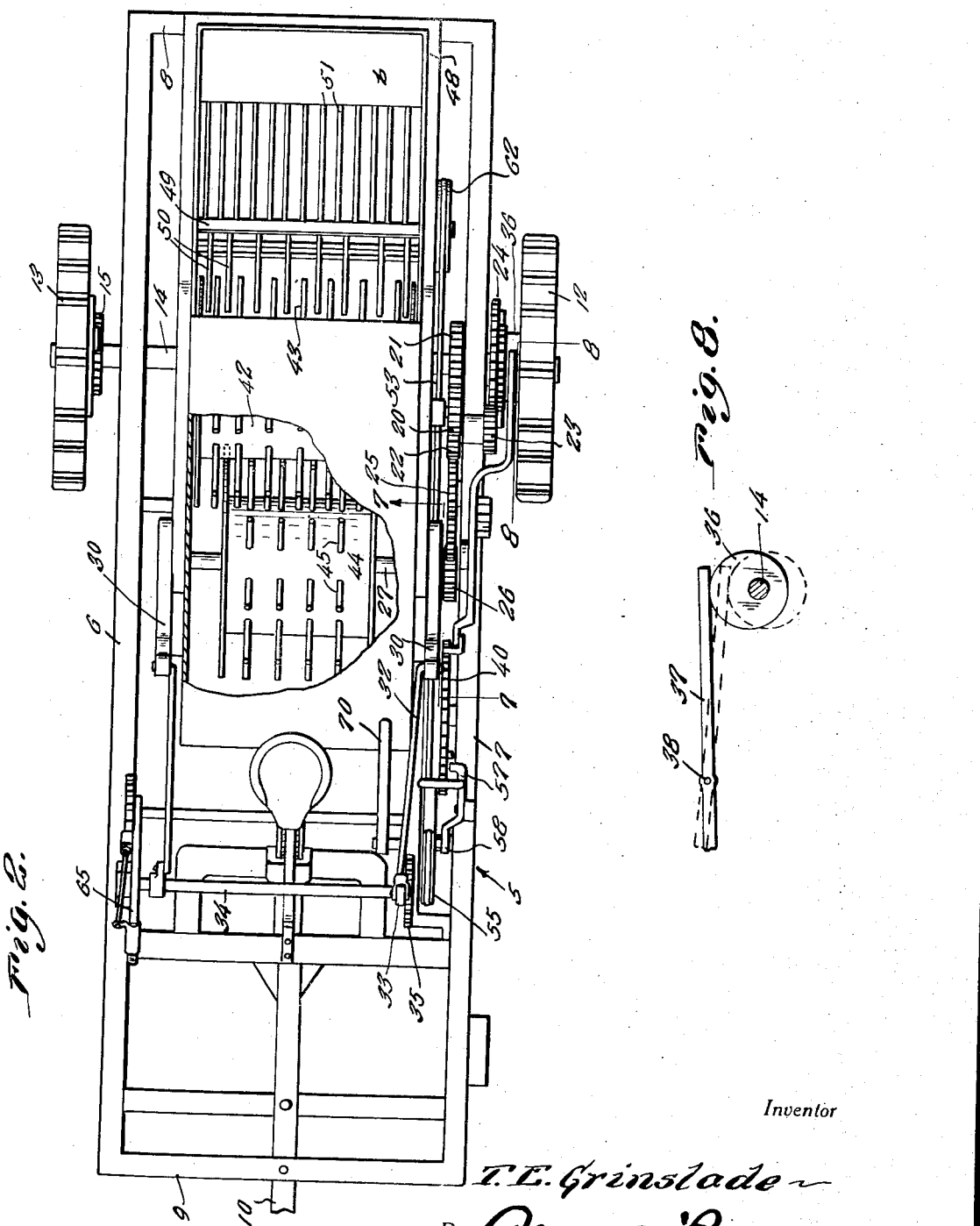

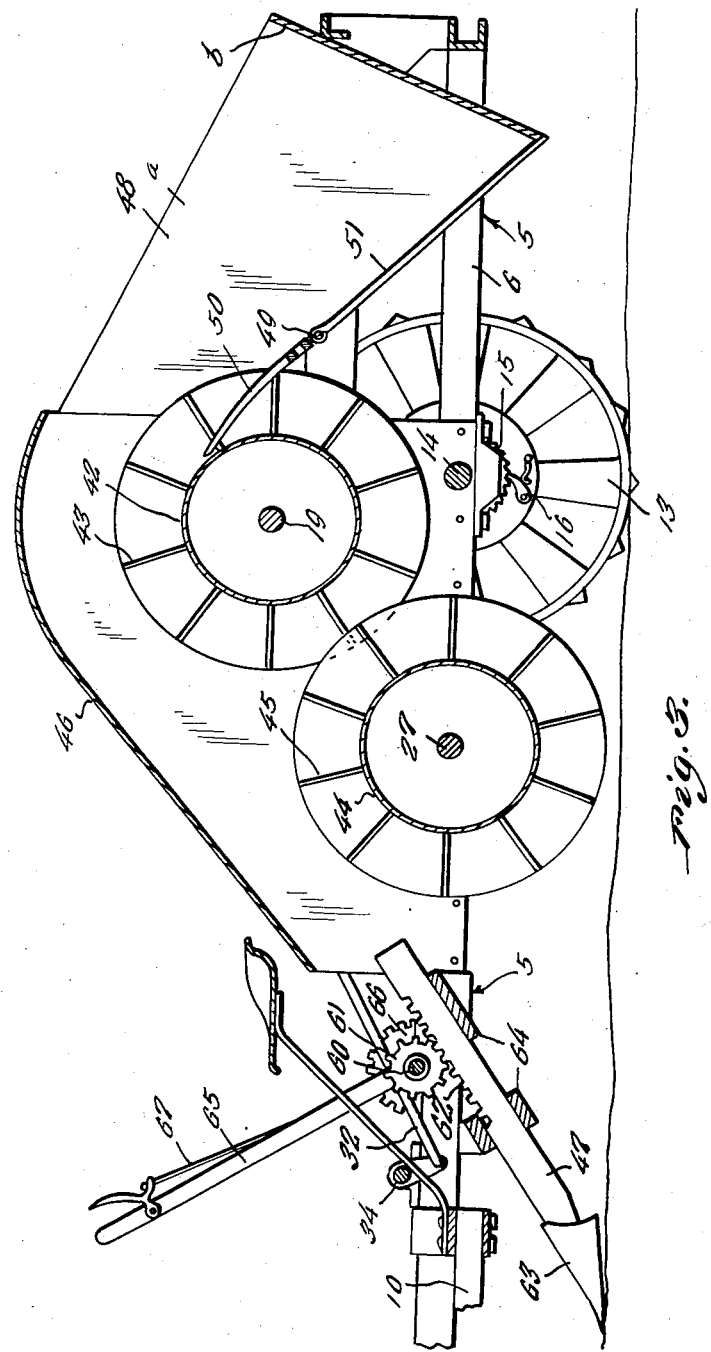

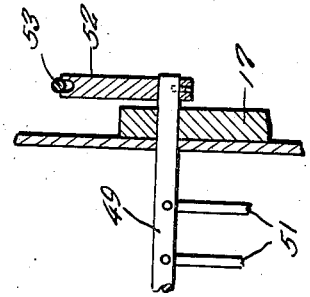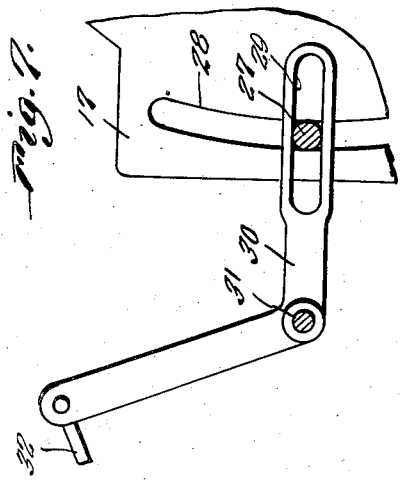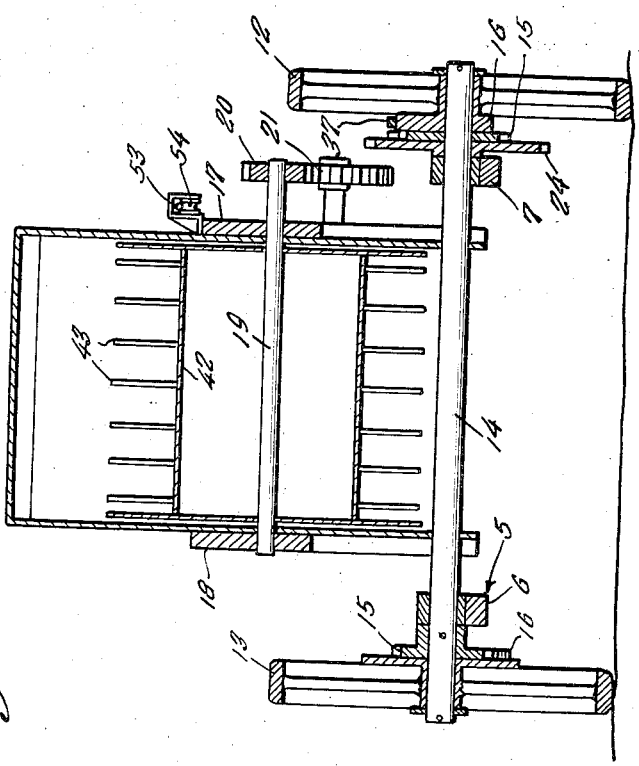

2,054,501

UNITED STATES PATENT OFFICE 2,054,501

PEANUT HARVESTER

Thomas E. Grinslade, Panama City, Fla.

Application April 27, 1936, Serial No. 76,683

7 Claims. (Cl. 55—9)

This invention relates to new and useful improvements in the general art of harvesters and more particularly to a machine especially adapted for harvesting peanuts.

The principal object of the present invention is to provide a machine which will plow up peanut plants and subsequently pick the same up and dump them in an orderly manner.

Another important object of the invention is to provide a peanut harvesting machine which will save the expense of paying numerous men heretofore required in attending to the harvesting of peanuts.

Another important object of the invention is to provide a machine which in many respects is automatic.

Other important objects and advantages of the invention will become apparent to the reader of the following specification.

In the drawings:

Figure 1 represents a side elevational view of the machine.

Figure 2 represents a top plan view of the machine.

Figure 3 is a longitudinal sectional view through the apparatus.

Figure 4 is a transverse section on line 4—4 of Figure 1.

Figure 5 is a side elevational view of one of the pulleys.

Figure 6 is a fragmentary detailed sectional view on line 6—6 of Figure 1.

Figure 7 is a fragmentary detailed sectional view substantially on line 7—7 of Figure 2.

Figure 8 is a sectional view taken substantially on line 8—8 of Figure 2.

Referring to the drawings wherein like numerals designate like parts, it can be seen that numeral 5 generally refers to the chassis or frame of the machine which consists of the side bars 6—7 and the end bars 8—9. Numeral 10 represents a suitable draft beam. At the forward end of the frame is the ground engaging caster wheel 11, while numerals 12—13 represent the main supporting wheels of the machine, each of which is rotatably mounted on one end of the axle 14. As is shown in Figure 3, each end portion of the axle 14 is provided with a ratchet wheel 15 and spring pressed pawls 16 on the wheels engage the ratchet wheel 15 so that as the machine moves forwardly the wheels in turning also turn the shaft 14 and of course these pawls and ratchets act as a differential when the machine is required to make a turn.

A pair of risers 17—18 on the frame 5 support the horizontal shaft 19 which at one end projects beyond the risers 17 and is equipped with the pinion 20 meshing with the gear 21. This gear 21 on a stub shaft meshes with the gear 22 on the shaft with the pinion 23 which meshes with the drive gear 24 on the axle 14.

The gear 22 in turn meshes with the large gear 25, which in turn meshes with the pinion 26. This pinion 26 is mounted on a stub shaft 27 which projects through the arcuate slots 28 on the riser 17. This stub shaft 27 also extends through the longitudinal slot 29 in the lower portion of the bell crank 30 which is rockably supported at 31 on the side of the hood 46 and has a rod 32 extending from the upper end thereof to the hand lever 33 on the shaft 34, which hand lever 33 is provided with a rack and detent assembly 35.

As is clearly shown in Figures 1 and 2, the wheel 12 carries a cam 36 with which one end of the elongated rocker bar 37 engages. This rocker bar has its fulcrum as at 38 and at its opposite end is provided with a spring pressed pawl 39 engaged with the large ratchet wheel 40 rotatably mounted as at 41 on the frame bar 7.

As is shown in Figure 4, the shaft 19 has a drum 42 carried thereby and from this projects a plurality of radially disposed tines 43. On the shaft 27 which is forwardly located of the shaft 19 is the drum 44 provided with the radially disposed tines 45, this shaft 27 of course extending through the arcuate slot 28 and the slot 29 of the bell crank 30.

Numeral 46 represents a hood extending upwardly from the rear end of the plow shank 47 and terminating over the rear portion of the drum 42. Numeral 48 represents a gathering box consisting of the side walls a—a and the back wall b and as is clearly shown in Figure 3, numeral 49 represents a cross rod in this box from which extend tines 50. These tines extend upwardly and in close proximity to the drum 42 so as to collect matter on the drum. These tines 50 in other words guide the peanut vines into the box 48 where they rest upon the grille 51 carried by the rod 49.

This rod 49 is rotatable and projects beyond one of the side walls a where it is equipped with a partial pulley wheel 52 over which the cable 53 extends and is secured at one end to the pulley at one end of the pulley groove. This cable 53 extends over the idler pulley 54, forwardly to engage under the pulley 55. This pulley 55 is also a mutilated pulley, the cable 53 being secured in one end of its groove outlet 56.

A rockable arm 57 mounted on the frame bar 7 has a hook head 58 for engaging a lug 59 on the mutilated pulley 55. The opposite end of this bar 57 is in the path of the pintle 59 projecting laterally from the large ratchet wheel 40.

At the forward end portion of the frame 5 is a transverse shaft 60 provided with a pinion 61 engaging the teeth 62 of the rack portion of the shank 47 of the plow 63. This plow shank 47 operates in the guide structure 64. Obviously by operating the hand lever 65, the plow 63 can be elevated or lowered and a rack 66 and detent 67 permits this plow to be held at any desired position with respect to the ground.

The shaft 68 to which the mutilated gear 55 is secured can be rotated by the hand lever 70, so that by releasing the catch arm 57, the load in the box 48 can be dropped and obviously by pulling back on the hand lever 70, the pulley 55 will automatically catch with its lug 59 behind the catch arm 57.

When the load is to be automatically dumped, the operator depends upon the cam 36. As the wheel 12 rotates, the cam delivers an upward and downward movement to the rocker arms 37 which in turn moves the ratchet wheel 40 one tooth each rotation of the wheel 12 so that eventually the pin 59 in rocking against the rocker arm 57 of the catch will release the catch from the lug 59 of the pulley 55 so that the pulley will be freed and the weight of the load in the box 48 will permit the grille 51 to drop and release the load on to the ground.

It can be seen, that in operation the plow 63 cuts through the tap roots of the peanut vines and plows them up for the pick-up drum 44. This drum and tines 45 pick up the peanut vines, lift them into the range of the drum 42 which subsequently elevates the vines to a position where they are taken off by the tines 50 and slide into the box 48.

The throw of the rocker arm 37 for gauging the number of teeth the ratchet wheel 40 is to be moved each rotation of the wheels 12 is denoted by numeral 73 and consists of a rockable member provided with teeth 74 of different lengths. This swingable member 73 may be provided with a protuberance on its inner side engageable into any one of the recesses 75 for holding the member 73 in any desired position so that the arm 37 can abut any one of the teeth 74 to regulate the throw of the said arm 37.

While the foregoing specification sets forth the invention in specific terms, it is to be understood that numerous changes in the shape, size and materials may be resorted to without departing from the spirit and scope of the invention as claimed hereinafter.

Having thus described the invention, what I claim as new is:

1. A peanut harvester comprising a wheeled frame, a plow mounted on the frame for engagement with the ground, a vine collecting box at the rear of the frame, elevating drums mounted on the frame for delivering vines to the box, one of said drums being adapted to elevate vines from the ground.

2. A peanut harvester comprising a wheeled frame, a plow mounted on the frame for engagement with the ground, a vine collecting box at the rear of the frame, elevating drums mounted on the frame for delivering vines to the box, one of said drums being adapted to elevate vines from the ground, and means whereby the last mentioned drum can be vertically adjusted.

3. A peanut harvester comprising a wheeled frame, a plow mounted on the frame for engagement with the ground, a vine collecting box at the rear of the frame, elevating drums mounted on the frame for delivering vines to the box, one of said drums being adapted to elevate vines from the ground, means whereby the last mentioned drum can be vertically adjusted, and radially disposed tines on the said drums.

4. A peanut harvester comprising a wheeled frame, a plow mounted on the frame for engagement with the ground, a vine collecting box at the rear of the frame, elevating drums mounted on the frame for delivering vines to the box, one of said drums being adapted to elevate vines from the ground, and cam means between one of the wheels of the frame and the box whereby the box can be dumped automatically.

5. A peanut harvester comprising a wheeled frame, a plow at one end of the frame, a receiving box at the opposite end of the frame, a ground engaging lifting drum provided with radially disposed tines, an elevated drum provided with radially disposed tines for removing collected vines from the lifting drum and discharging the same into the said box, said box being provided with a swingable bottom, a shaft to which the swingable bottom is secured, and means for operating the said shaft from the front part of the frame.

6. A peanut harvester comprising a wheeled frame, a plow at one end of the frame, a receiving box at the opposite end of the frame, a ground engaging lifting drum provided with radially disposed tines, an elevated drum provided with radially disposed tines for removing collected vines from the lifting drum and discharging the same into the said box, said box being provided with a swingable bottom, a shaft to which the swingable bottom is secured, means for operating the said shaft from the front part of the frame, said means consisting of a pulley on the shaft, a cable extending from the pulley to the front part of the frame, and hand controlled means at the front part of the machine for actuating the said cable.

7. A peanut harvester comprising a wheeled frame, a plow at one end of the frame, a receiving box at the opposite end of the frame, a ground engaging lifting drum provided with radially disposed tines, an elevated drum provided with radially disposed tines for removing collected vines from the lifting drum and discharging the same into the said box, said box being provided with a swingable bottom, a shaft to which the swingable bottom is secured, means for operating the said shaft from the forward portion of the frame, said means consisting of a pulley on the shaft, a pulley at the forward portion of the frame, a cable secured at one end to the first mentioned pulley and at its opposite end to the last mentioned pulley, a catch for the last mentioned pulley, and cam means between one of the wheels of the frame and the catch whereby the catch will be operated to release the forward pulley after a predetermined travel distance of the wheel.

THOMAS E. GRINSLADE.